Sept. 23, 1941.  E. K. KINTNER  2,256,904
PASTEURIZING PROCESS AND APPARATUS
Original Filed Feb. 28, 1940   7 Sheets-Sheet 1

INVENTOR:
Edwin K. Kintner,
BY Harry B. Cook,
ATTORNEY.

Sept. 23, 1941. E. K. KINTNER 2,256,904
PASTEURIZING PROCESS AND APPARATUS
Original Filed Feb. 28, 1940 7 Sheets-Sheet 6

INVENTOR
Edwin K. Kintner,
BY Harry B. Cook,
ATTORNEY.

Sept. 23, 1941.   E. K. KINTNER   2,256,904
PASTEURIZING PROCESS AND APPARATUS
Original Filed Feb. 28, 1940   7 Sheets-Sheet 7

Patented Sept. 23, 1941

2,256,904

UNITED STATES PATENT OFFICE 2,256,904

PASTEURIZING PROCESS AND APPARATUS

Edwin K. Kintner, Millburn, N. J., assignor to Arco Welding & Machine Works, Inc., Jersey City, N. J., a corporation of New Jersey Original application February 28, 1940, Serial No. 321,172. Divided and this application July 23, 1940, Serial No. 346,910

11 Claims. (Cl. 219—40)

This invention relates to a method and apparatus for pasteurizing liquids, particularly milk, and this application is a division of my copending application Serial No. 321,172, filed February 28, 1940.

It is well-known that the success of the process of pasteurization depends largely upon rapid, economical and uniform treatment of the liquid to be pasteurized with an accurate control of the pasteurizing temperature so as to secure sterilization or kill of bacteria without producing undesired changes in the character of the treated liquids.

Heretofore some known pasteurizing methods and apparatus utilize high temperature hot water for heating milk or the like to the required pasteurizing temperature, approximately 163°, but these methods and apparatus are not entirely satisfactory because of inefficiency and because the heating of the milk indirectly by transmission of heat through a wall of the apparatus between the hot water and the milk frequently results in deleterious effects on the flavor and cream line of the milk. Other known pasteurizing methods and apparatus embody the heating of the milk by regeneration, that is by heating the cold raw milk by the previously pasteurized hot milk, to for example from 40° to 135° and thereafter directly heating the milk with an electrical heater to the required pasteurizing temperature, but these methods and apparatus are excessively expensive.

A prime object of my invention is to provide a method and apparatus for heating liquids in successive stages in an efficient and economical manner by heating the liquid to a temperature slightly below the final required or pasteurizing temperature with hot water or a combination of regenerative heating and hot water, and thereafter raising the liquid to the required final or pasteurizing temperature by an electrical heater.

Another object of the invention is to provide such a method and apparatus which shall include simple and efficient control of the temperature of the milk or other liquid under treatment, and more specifically to simply and efficiently control the temperature of the hot water as a function of or in accordance with the temperature of the milk at the electric heater while permitting the heat output of the electric heater to remain constant.

Further objects are to provide a pasteurizing apparatus of the plate type which shall include plates of novel, improved and simple construction to provide fluid passages of large capacity, permit the plates to be made thin to insure efficient transfer of heat, and prevent warping or bending of the plates under pressure of the liquids flowing therebetween; and to provide novel and improved means for mounting and clamping the plates together to ensure against uneven or warping strains.

A further object is to provide heat exchange plates which shall have novel and improved rubber gaskets to provide effective and sanitary seal of the passages between the plates and protect the plates against injury through handling.

Other objects, advantages and results of the invention will appear from the following description when read in conjunction with the accompanying drawings in which.

Figures 5, 10A, 11A:
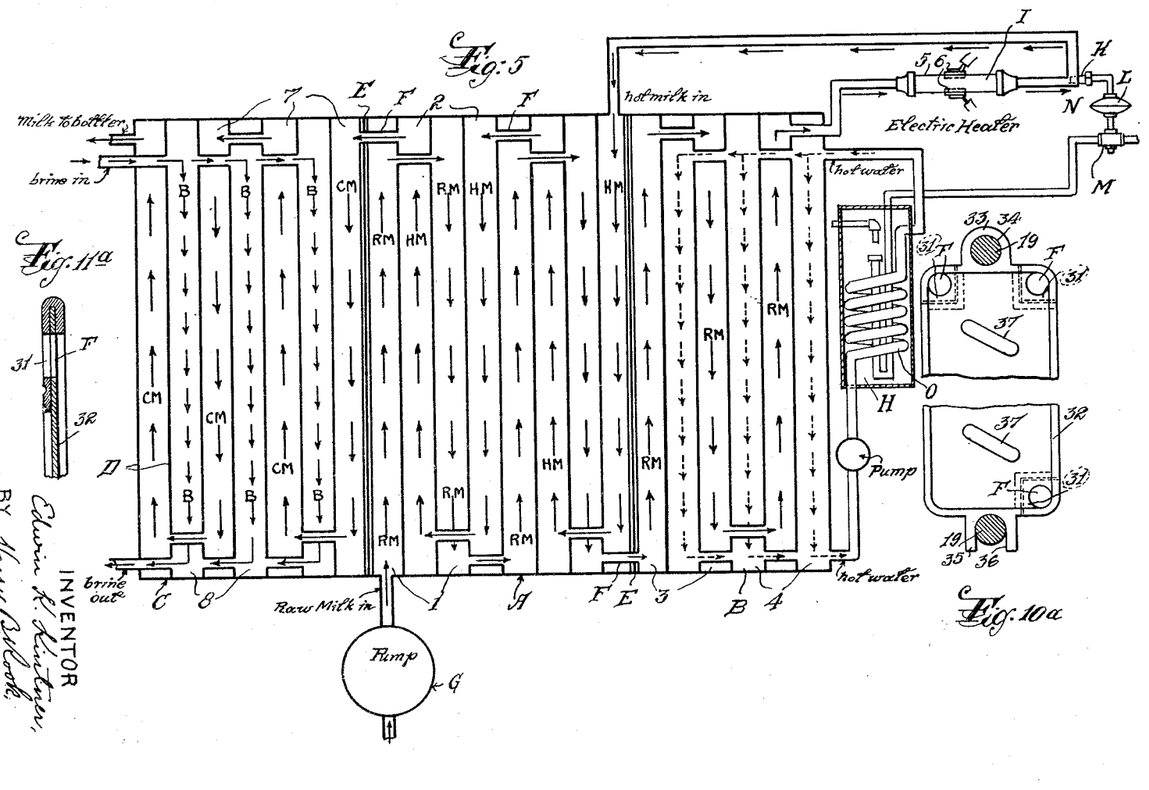
Figure 5 is a diagrammatic view of the apparatus showing the liquid circuits and heater.
Figure 10a is a side elevational view of the opposite side of the plate shown in Figure 10, with portions broken away.
Figure 11a is a fragmentary transverse vertical sectional view on the line 11a—11a of Figure 11.

Specifically describing the invention and with particular reference to Figure 5 of the drawings, my heat exchanger is divided into a regenerative heating section A that is located between a hot water heater section B and a cooler section C.

Each section comprises a plurality of heat exchange plates generally designated D, and between the end plates at the adjoining ends of the sections are separator plates E. The heat exchange plates and separator plates are provided with ports F, and the plates are so arranged in spaced relation to each other to form passages between them for the various liquids involved in the process, particularly milk, hot water and brine.

In the regenerative heater section A, the plates and ports are so arranged that the spaces 1 provide circuit passages for the incoming raw milk or other liquid to be pasteurized, while the alternate spaces 2 form circuit passages for the hot milk which has been pasteurized. The raw milk is supplied by a pump G and flows through the passages 1 in the directions indicated by the arrows denominated RM, while the hot pasteurized milk flows through the spaces 2 in the direction of the arrows designated HM.

The raw milk is warmed by the hot milk in the regenerative heater section by heat transfer through the heat exchange plates and passes into the hot water heater section B through the spaces 3. Hot water from a hot water heater H of suitable construction is caused to circulate through the passages 4 in the direction indicated by the dotted line arrows. The warm milk is further heated in the section B and then passes to an electric heater I of generally known construction which includes a tube 5 of insulating material having spaced electrodes 6 projecting therethrough and into contact with the milk flowing through the tube, said electrodes being connected in an electric circuit in known manner. After leaving the electric heater I, the hot pasteurized milk is returned to the regenerative heater section A, as above described, passes through said section and into the cooler section C.

In the cooler section the milk flows through the passages 7 in the direction of the arrows denominated CM, while the cooling liquid, preferably brine, flows through the passages 8. Preferably the incoming brine is admitted at the top of the passages 8 and flows downwardly in the direction of the arrows designated B to the bottom of said passages where it is discharged and returned to the brine cooling and circulating mechanism.

In operation, the raw milk is constantly pumped into the apparatus at a temperature of approximately 40°, and is heated in the regenerative heater section A to approximately 135° by the previously pasteurized hot milk which is thereby cooled from a temperature of approximately 163° to approximately 70°. The warmed raw milk is then heated in the hot water heater section B from a temperature of about 135° to about 160°. It has been found that this is about the maximum temperature to which milk may be heated by transmitted heat without deleterious effect upon the quality of the milk. The heated milk is then heated in the electric heater I from approximately 160° to the desired pasteurizing temperature of approximately 163°. As above stated, the pasteurized milk from the electric heater I is then passed through and cooled in the regenerative heater section to a temperature of approximately 70°. Preferably the diameter and length of the conduit for the milk from the bulb K to the regenerative heater are related to the speed of flow caused by pump G so that about fifteen seconds is required for passage of milk through said conduit. The pasteurized milk is then further cooled in the cooler section C to the desired bottling temperature, and the milk is removed from the cooling section in any suitable manner and conducted to any suitable point, for example a bottling machine.

It is desirable to accurately control the temperature of the pasteurized milk, and it is one feature of the invention to control the temperature of the hot water in the hot water heater section B as a function of or in accordance with the temperature of the pasteurized milk in the electric heater I. For this purpose, I may utilize a known type of bulb K inserted into the milk conduit which controls a known type of air operated valve actuating mechanism schematically illustrated at L for regulating a steam valve M in the steam supply pipe N which supplies steam to the hot water heater H which includes a coil O in contact with the steam and through which the hot water is pumped by a pump in a circuit which includes the passages 4 of the hot water heater section B. With such an apparatus, the input of steam into the hot water heater H is varied to maintain the temperature of the milk at the bulb K at the desired pasteurizing temperature, namely approximately 163°. This control is effected without varying the heat input into the milk by the electric heater I.

If desired, instead of controlling the temperature of the hot water as above described, the hot water may be maintained at a constant temperature, for example 160°, and the control of the temperature at the bulb K may be effected by varying the spacing of the electrodes 6 or the input of electric current to the heater. It will also be understood that other types of electric heaters than that described, may be utilized.

Now more specifically describing the structure of the apparatus, and with particular reference to the heat exchanger, the apparatus includes a frame comprising a base 10 having a pair of spaced standards 11 and 12 mounted thereon that may be of any suitable construction. Each standard is approximately channel-shaped with the channel facing inwardly, and for sanitary purposes the standards and base may be incased in a chromium-plated housing.

Figure 1:
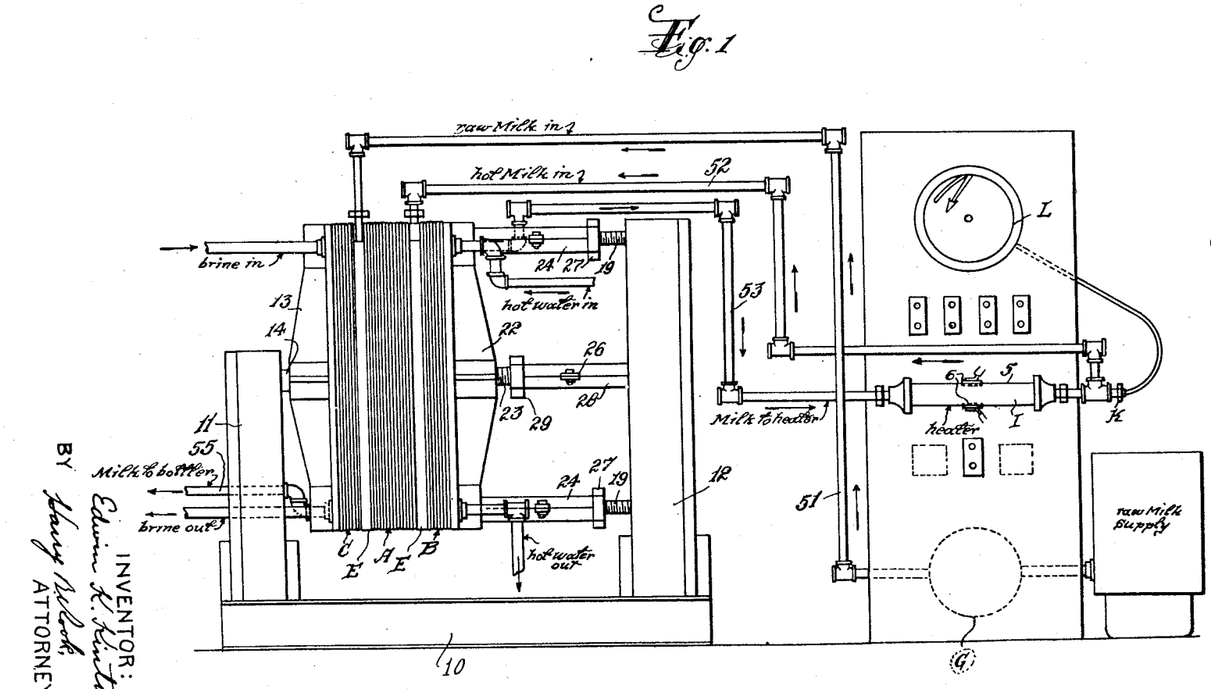
Figure 1 is a schematic side elevational view of pasteurizing apparatus constructed in accordance with my invention.
Figure 2:
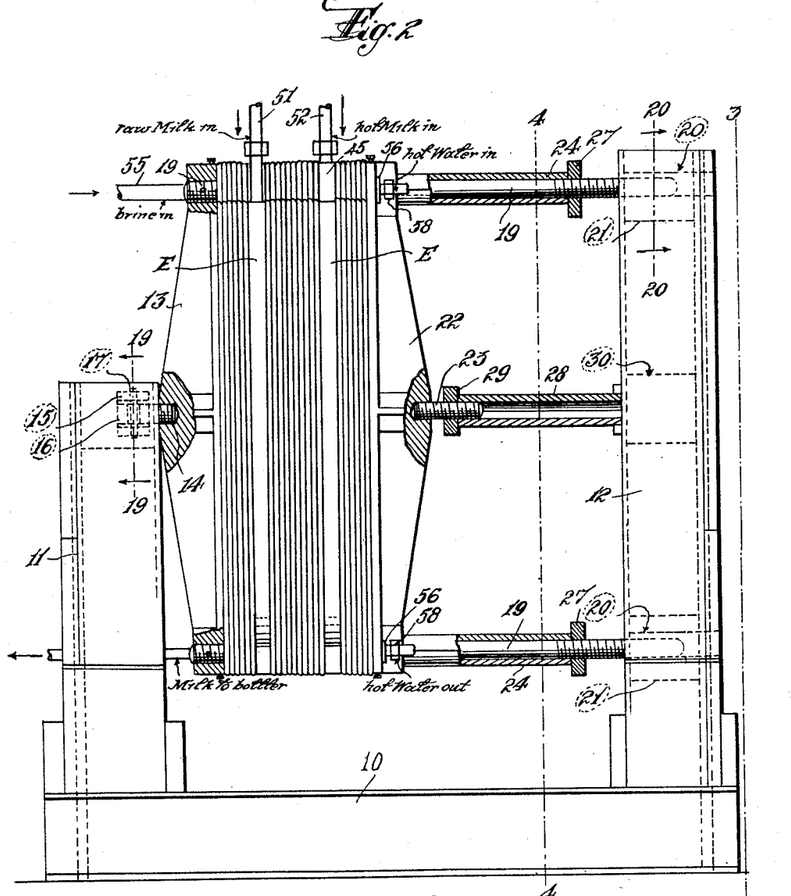
Figure 2 is a fragmentary enlarged side elevational view of the heat exchange unit with portions broken away and shown in section.
Figure 3:
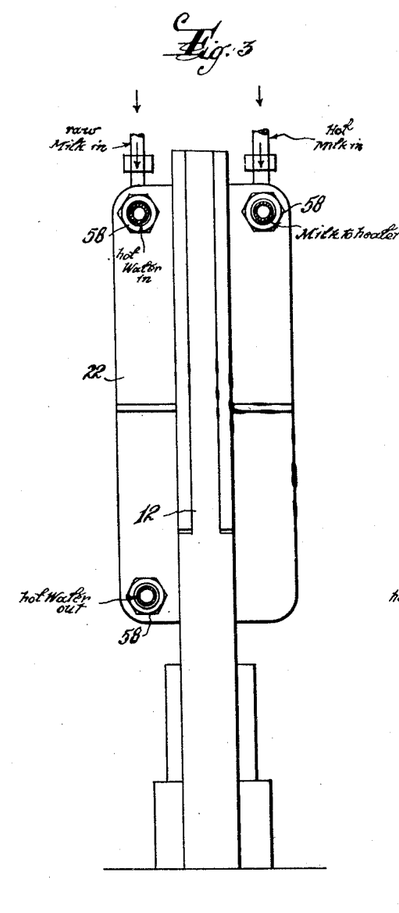
Figure 3 is an end elevational view of the unit viewed from the line 3—3 of Figure 2.
Figure 4:
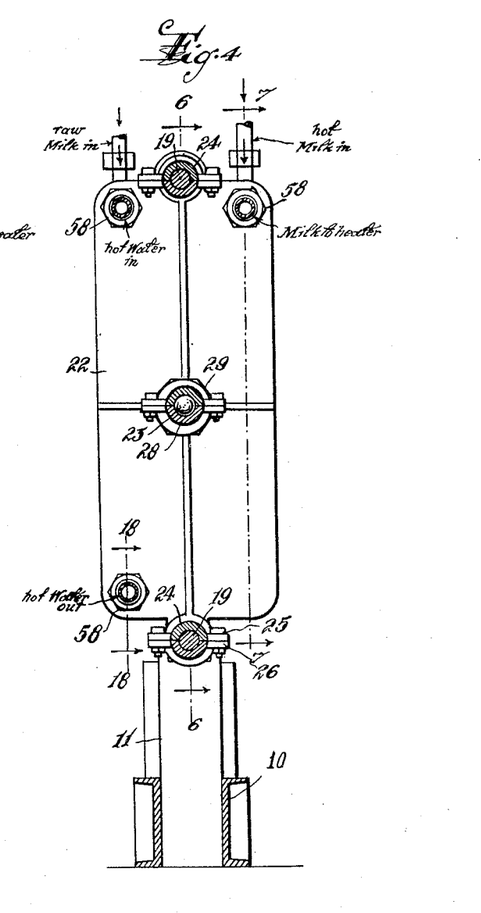
Figure 4 is a transverse vertical sectional view on the line 4—4 of Figure 2.

A head plate 13 is mounted on the standard 11 by a bolt 14 screw-threaded into the header plate approximately centrally of its length and loosely mounted for universal movement in an opening 16 in a block 15 that is secured in the channel of the standard. To hold the bolt against being pulled out of the opening 16, a pin 17 passes through the block and loosely through a vertical transverse opening 18 in the bolt. In each of the upper and lower ends of the header is secured one end of a rod 19 the other end of which is loosely mounted in a socket 20 formed in a block 21 secured in the standard 12. A second header plate 22 has each end slidably mounted on one of the rods 19 to move toward and from the other header 13. At approximately the central point in its length, the header plate 22 has secured therein a bolt 23 disposed in opposed coaxial relation to the bolt 14. The two headers 13 and 22 serve to clamp between them the heat exchange and separator plates in liquid tight relation to each other.

For securely clamping the header 22 in position and permitting easy and quick release thereof for cleaning or adjustment of the heat exchange and separator plates, I provide a sleeve 24 on each of the bolts 19 formed of two complemental sections semi-circular in cross section to be applied to and removed from the bolts from opposite sides thereof and separably secured together in any suitable manner as by one or more bolts 25 passing through lugs 26 on the sections. One end of each sleeve 24 abuts the header plate 22, while a nut 27 threaded on the bolt 19 abuts the other end of the sleeve.

Similarly I provide a sleeve 28 of like construction having one end mounted on the bolt 23 and engaged by a nut 29 threaded on the bolt, the other end of the sleeve abutting a block 30 in the standard 12.

With this construction, the heat exchange and separator plates may be assembled on the bolts 20 between the headers 22, the sleeves 24 and 28 placed in position and the respective nuts 27 and 29 tightened so as to firmly clamp the plates between the headers. Any inequailties of unevenness in the strains imposed upon the opposite ends of the plates by tightening of the nuts 27, are compensated by swivel action of the headers and plates as a unit about the connection of the bolt 14 to the standard 11, this connection permitting the headers to swing both in a vertical and a horizontal plane.

The plates may be easily and quickly separated by simply loosening the nuts 27 and removing the sleeves 24 and 28, which permits the header 22 to be slid rapidly toward the standard 12 and provide adequate room for manipulation of the heat exchange and separator plates.

Figure 6:
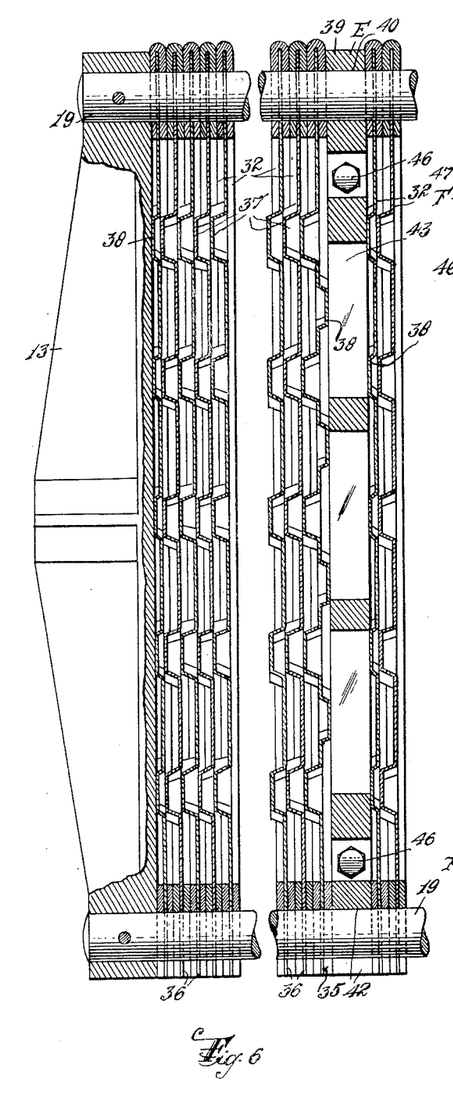
Figure 6 is an enlarged longitudinal vertical sectional view on the line 6—6 of Figure 4, parts being omitted.
Figures 7, 8:
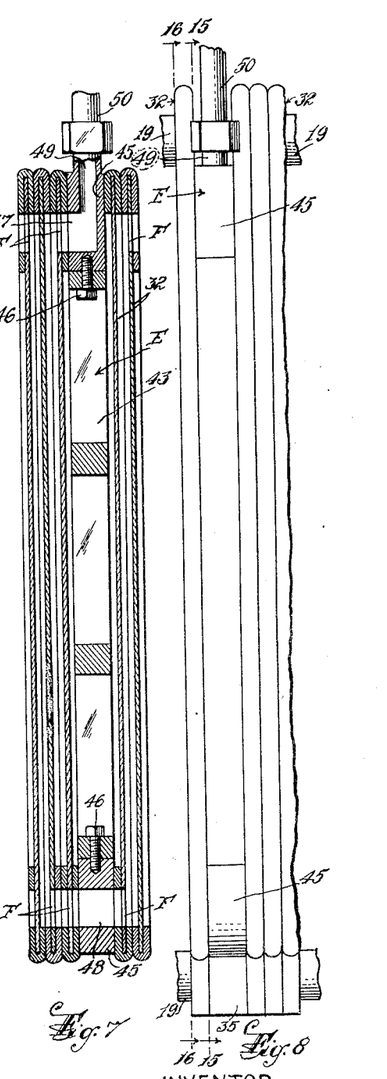
Figure 7 is a similar view on the line 7—7 of Figure 4.
Figure 8 is an enlarged fragmentary side elevational view of a portion of the heat exchanger unit.

All of the heat exchange plates D are in general of the same construction, differing primarily in the arrangement of the ports and corresponding gaskets and in the arrangement and size of the projections on the plates which serve to space adjacent plates from each other. Preferably the exchange plates are formed of approximately 20 gauge sheet metal, preferably stainless steel, and are generally rectangular in cross section. A few of the plates are illustrated in Figures 9 to 14 inclusive and in Figures 6, 7 and 8.

Each plate has one or more transverse ports F so arranged as to form the desired circuits for the liquids transversely from the spaces between the plates, and depending upon the position at which it is desired to use the plate, it has a rubber packing gasket 31 at one or both sides of the plate surrounding each port. Also both sides of each plate along its margins have rubber packing 32 to abut the corresponding packing of the adjacent plates and form liquid tight passages between the adjacent plates.

This rubber packing is preferably vulcanized to the sheets as by painting successive layers of unvulcanized rubber composition on the plates, permitting each layer to dry before the application of the next layer, and then applying a final layer of unvulcanized rubber composition and vulcanizing the whole under a pressure of approximately 2500 pounds. This provides a sanitary structure, the vulcanization of the gaskets to the plates eliminating possibility of crevices between the gaskets and plates in which foreign matter might accumulate.

Also, preferably the rubber packing is caused to embrace the edges of the plates as shown in Figure 11a, and with the packing so applied, it protects and reenforces the edges of the plates against bending or denting during handling of the plates.

Each plate has at one end a lug 33 formed with an opening 34 to be slidably mounted on the upper rod 19 of the heat exchanger, and a lug 35 at the other end having a notch 36 to slide over the lower rod 19.

Each exchange plate also has a row of projections 37 extending along the central longitudinal portion of one side of the plate to space the plate from the next adjacent plate when all of the plates are assembled for operation. These projections may be conveniently stamped from the plates and preferably extend diagonally of the plates so that the projections of one plate will be disposed in crossed relation to the projections of the other plates when the plates are assembled. The projections extend from the general plane of the side of the plate a distance approximately equal to the total thickness of the two abutting layers of the rubber packing 32 on the adjacent plates as clearly shown in Figure 6.

The first plate at the left of the series of plates in each section of the exchanger differs from the other plates above mentioned in that its projections extend from the plate a distance equal to the thickness of the rubber gasket at one side of the plate, one of these plates being arranged in direct contact with the header plate 13 and one of said plates being also in contact with each of the separator plates E.

Figure 9:
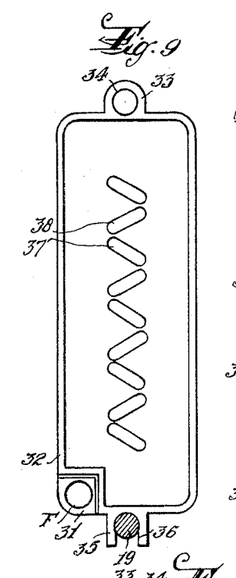
Figure 9 is a side elevational view of one of the end plates for the heating exchanging sections of the heat exchanger unit.
Figures 10, 11:
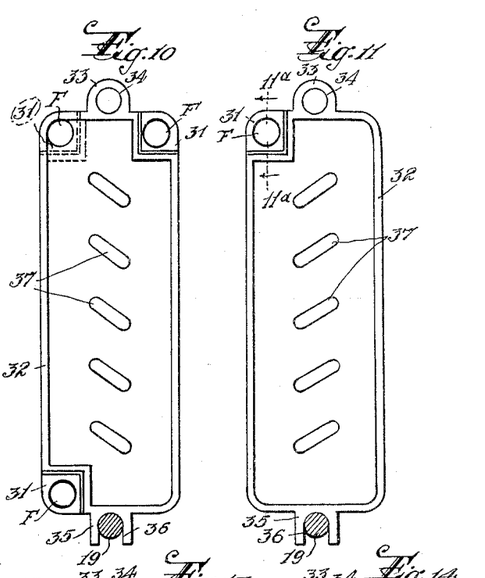
Figure 10 is a similar view of one of the heat exchange plates.
Figure 11 is a similar view of another heat exchange plate.
Figures 12, 13:
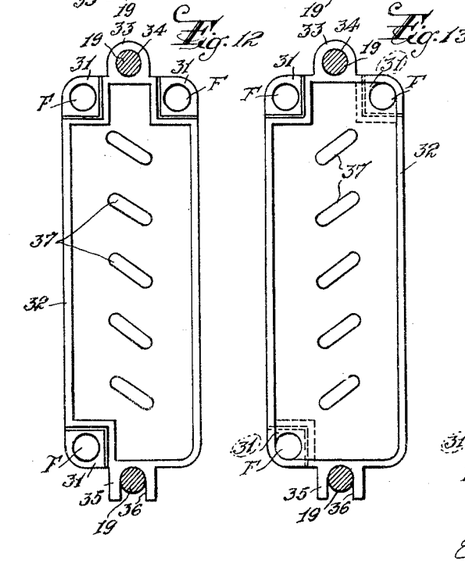
Figures 12 to 14 are views similar to Figure 10 showing other heat exchange plates.
Figure 14:
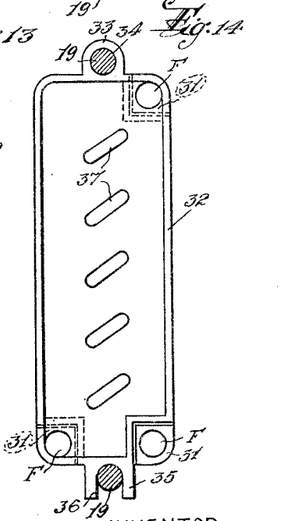

Also each plate at the opposite end of each section of the heat exchanger is of special form, as shown in Figure 9, in that it has in addition to the projections 37, another series of projections 38 that extend from the side of the plate opposite that from which the projection 37 extends and a distance from the face of the plate substantially equal to the thickness of one layer of the rubber gasket 32. The projections 38 are provided for abutting the separator plates E and the header plate 22.

The projections on all of the plates serve both to hold the plates in spaced relation to each other to provide free passages for the liquids between the plates, and also prevent buckling or warping of the plates under the pressure of the flowing liquids.

Figures 15, 16, 17:
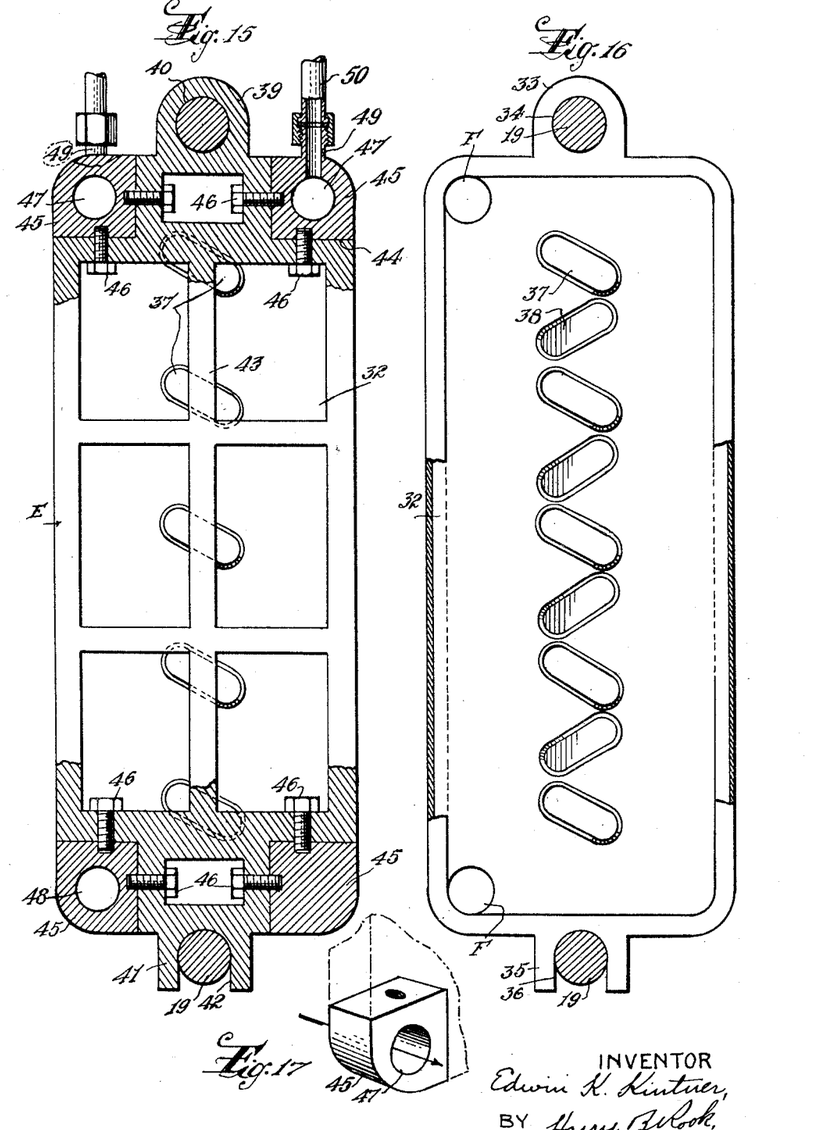
Figure 15 is a transverse vertical sectional view on the line 15—15 of Figure 8 showing one of the separator plates for separating the sections of the heat exchanger unit, portions of the separator plate being broken away and shown in section.
Figure 16 is a similar view on the line 16—16 of Figure 8.
Figure 17 is a detached perspective view of one of the port blocks for the separator plates.

Now referring to the separator plates which are illustrated in Figure 15 of the drawings, the plates may be substantially identical and include a main body, preferably of cast metal, of gridlike formation for lightness in weight, and having a lug 39 at one end formed with an opening 40 to slide over the upper rod 19, and a lug 41 at the other end formed with a slot 42 to slide over the other rod 19. Each plate also has a continuous longitudinal portion 43 to form a bearing for the projections 38 of the abutting exchange plates above described.

These separator plates also provide ports for the inlet of certain of the liquids and for passage of the liquids from one of the sections to another of the heat exchanger. As shown, each corner of the separator plate is provided with a right angular notch 44 in which is separably fitted a block 45 as by cap screws 46. Some of these blocks will have angular inlet passages 47 while others of the blocks will have transverse through ports 48 to permit passage of liquids from one exchanger section to another, as shown at the top and bottom respectively of Figures 7 and 15. Where no inlet or through port is required, the block may be solid as shown at the right-hand side of the bottom of Figure 15.

Preferably the inlet port blocks will have pipe coupling fittings 49 connected thereto for connection of the fluid pipes.

As shown in the drawings, the raw milk inlet pipe 51 from the pump G is connected to the inlet port of one of the separator plates, while the pipe 52 for conveying or conducting milk from the electric heater I to the regenerative heater section A is connected to the inlet port of the other separator plate. The warmed milk from the hot water heater section B is led outwardly through the header 22 to the electric heater I by a pipe 53.

As shown in the drawings, the hot water is led into and out of the hot water heater section B by a pipe line 54 through the end plate 22, while the brine for the cooler section C is led into and out of said section through the other end plate 13. Also the pasteurized milk from the cooler section is led outwardly to the bottler through said header 13 by a pipe 55.

Figures 18, 20:
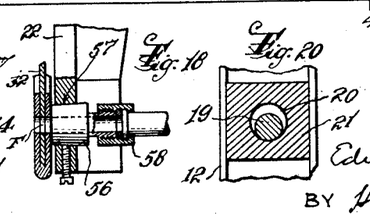
Figure 18 is a fragmentary vertical sectional view on the line 18—18 of Figure 4.
Figure 20 is a similar view on the line 20—20 of Figure 2.
Figure 19:
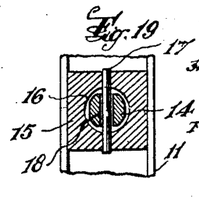
Figure 19 is a fragmentary vertical sectional view on the line 19—19 of Figure 2.

The connections for the respective pipes 53, 54 and 55 to the headers may be substantially identical and, for example, as illustrated in Figure 18. This coupling includes a fitting 56 which is secured with a liquid tight joint in an opening 57 in the header plate that is disposed in register with the port F of the abutting exchange plate. This fitting may be constructed to cooperate with a coupling nut 58 of known construction for connecting the corresponding pipe 53, 54 or 55 to the fitting.

It will be understood from the foregoing that the number, arrangement and construction of the various heat exchange plates D and separator plates E may be widely varied or changed, and that the invention may be embodied in other details of structure, without departing from the spirit or scope of the invention.

Having thus described my invention, what I claim is:

1. In a pasteurizing process, the steps of heating the liquid to be pasteurized in successive stages in a preliminary one of which the liquid is heated by circulating a heating fluid other than said liquid in heat exchanging relation to said liquid to heat the liquid to a temperature less than the final required temperature, and controlling the temperature of said heating fluid in accordance with the temperature of said liquid at the end of the final stage of heating.

2. In a pasteurizing process, the steps of heating the liquid to be pasteurized in successive stages by circulating a heating fluid other than said liquid in heat exchanging relation to said liquid during a preliminary stage, and then in the next succeeding and final stage circulating said liquid in heat exchanging relation to an electrical heater, and controlling the temperature of said heating fluid in accordance with the temperature of said liquid at the end of the final stage of heating.

3. In a pasteurizing process, the steps of heating the liquid to be pasteurized in successive stages by circulating a heating fluid other than said liquid in heat exchanging relation to said liquid during a preliminary stage, and then in the next succeeding and final stage circulating said liquid in direct contact with the electrodes of an electric heater and passing electric current through said electrodes and liquid, and controlling the temperature of said heating fluid in accordance with the temperature of said liquid at the end of the final stage of heating.

4. In a pasteurizing process, the steps of regeneratively heating the liquid to be pasteurized, then further heating the liquid by circulating it in heat exchanging relation to a heating fluid, and then finally heating the liquid by circulating it in heat exchanging relation to an electrical heater.

5. In a pasteurizing process, the steps of regeneratively heating the liquid to be pasteurized, then further heating the liquid by circulating it in heat exchanging relation to a heating fluid, and then finally heating the liquid by circulating it in direct contact with the electrodes of an electrical heater and passing electric current through said electrodes and said liquid.

6. Liquid heating apparatus comprising a plurality of heaters for heating liquid to be heated in successive stages, means for circulating a separate heating fluid through one of said heaters in a preliminary stage in heat exchanging relation to the liquid to be heated to heat said liquid to a temperature less than the final required temperature, and temperature regulating means controlled by the temperature at the end of the final stage of heating for controlling the temperature of the heating fluid in said preliminary heater.

7. Liquid heating apparatus comprising a plurality of heaters for heating the liquid to be heated in successive stages, means for circulating a heating fluid other than said liquid through one of said heaters in a preliminary heating stage in heat exchanging relation to said liquid to heat the liquid to a temperature less than the final required temperature, an electrical heater through which said heated liquid is next passed at a final stage, and temperature regulating means for said heating fluid controlled by the temperature of said liquid at the final stage of heating.

8. Liquid heating apparatus comprising a plurality of heaters for heating the liquid to be heated in successive stages, means for circulating a heating fluid other than said liquid through one of said heaters in a preliminary heating stage in heat exchanging relation to said liquid to heat the liquid to a temperature less than the final required temperature, an electrical heater including a plurality of electrodes between which said heated liquid is next passed in a final stage, and temperature regulating means for said heating fluid controlled by the temperature of said liquid at the final stage of heating.

9. Pasteurizing apparatus comprising a regenerative heater, means for circulating liquid to be pasteurized through said heater in heat exchanging relation to previously pasteurized hot liquid so as to preliminarily heat said liquid to be pasteurized, a second heater through which said preliminarily heated liquid is passed, means for circulating a separate heating fluid through said second heater in heat exchanging relation to said preliminarily heated liquid, an electrical heater, and means for circulating said preliminarily heated liquid through said electrical heater.

10. The pasteurizing apparatus set forth in claim 9 wherein said electrical heater includes spaced electrodes between which said liquid is circulated.

11. The pasteurizing apparatus set forth in claim 9, with the addition of temperature regulating means for said separate heating fluid controlled by the temperature of the heated liquid as it leaves said electrical heater.

EDWIN K. KINTNER.